(12) United States Patent
Svejda et al.

(10) Patent No.: US 6,767,930 B1
(45) Date of Patent: Jul. 27, 2004

(54) POLYHEDRAL OLIGOMERIC SILSESQUIOXANE POLYIMIDE COMPOSITES

(76) Inventors: Steven A. Svejda, 9700 Village Pkwy., California City, CA (US) 93505; Shawn H. Phillips, 2763 Legends Way, Lancaster, CA (US) 93536; Rene I. Gonzalez, 6859 Lindbergh Ave., Edwards, CA (US) 93523; Frank J. Feher, 3210 Montana Ave., Costa Mesa, CA (US) 92626; Joseph D. Lichtenhan, 31085 Via Sonora, San Juan Capistrano, CA (US) 92675; Joseph J. Schwab, 16352 Bradbury, Huntington Beach, CA (US) 92647; William A. Reinerth, 13471 Lynwood Pl., Garden Grove, CA (US) 92843

( * ) Notice: Subject to any disclaimer, the term of this patent is extended or adjusted under 35 U.S.C. 154(b) by 141 days.

(21) Appl. No.: 10/238,923

(22) Filed: Sep. 9, 2002

Related U.S. Application Data

(60) Provisional application No. 60/318,052, filed on Sep. 7, 2001.

(51) Int. Cl.[7] .................................................. C08J 9/00
(52) U.S. Cl. ......................... 521/134; 521/77; 521/184; 521/154
(58) Field of Search ........................ 521/134, 77, 184, 521/154

(56) References Cited

U.S. PATENT DOCUMENTS 6,162,838 A  *  12/2000  Kohl

* cited by examiner

Primary Examiner—Morton Foelak
(74) Attorney, Agent, or Firm—David Jaffer; Pillsbury Winthrop LLP

(57) ABSTRACT

Performance additives in high performance polymers using polyhedral oligomeric silsesquioxanes (POSS) and polyhedral oligomeric silicates (POS) as nanoscopic reinforcements, porosity control agents, thermal and oxidative stability aids to improve the properties of the polymers.

8 Claims, 16 Drawing Sheets

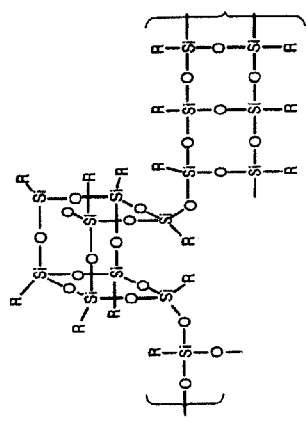
Example of Polysilsequioxane Resins $[RSiO_{1.5}]_\infty$
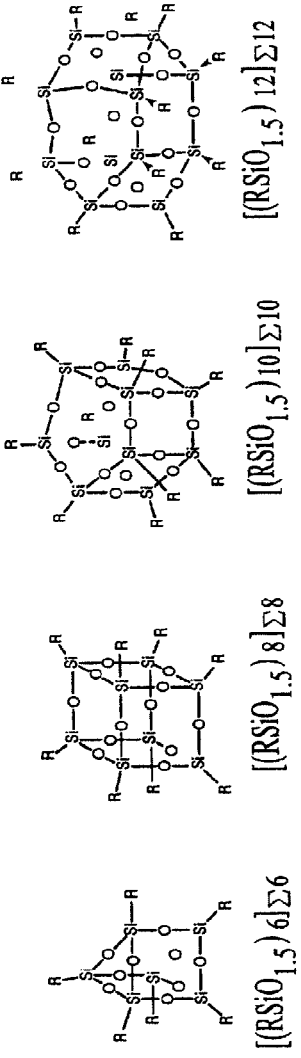
Examples of Homoleptic POSS Systems $[(RSiO_{1.5})]\Sigma\#$
FIG. 2/1

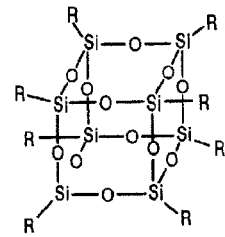
$[(RSiO_{1.5})_7(R'SiO_{1.5})_1]_{\Sigma 8}$
Example of a Heteroleptic POSS System $[(RSiO_{1.5})_n(R'SiO_{1.5})_m]_{\Sigma \#}$
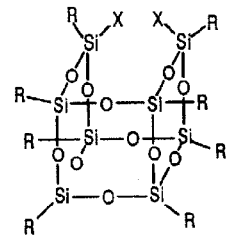
$[(RSiO_{1.5})_6(RXSiO_{1.0})_2]_{\Sigma 8}$
Example of a Functionalized Homoleptic POSS System $[(RSiO_{1.5})_n(RXSiO_{1.0})_m]_{\Sigma \#}$
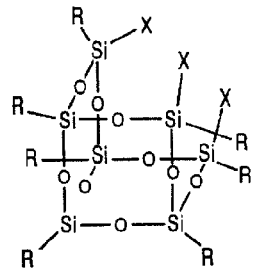
$[(RSiO_{1.5})_3(R'SiO_{1.5})_1(RXSiO_{1.0})_3]_{\Sigma 7}$
Example of a Functionalized Heteroleptic POSS System $[(RSiO_{1.5})_n(R'SiO_{1.5})_m(RXSiO_{1.0})_p]_{\Sigma \#}$
FIG. 2/2

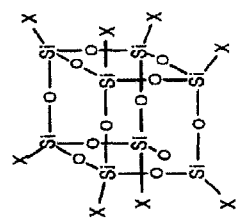
Example of a Polyhedral Oligomeric Silicate System $[(XSiO_{1.5})n]\Sigma\#$
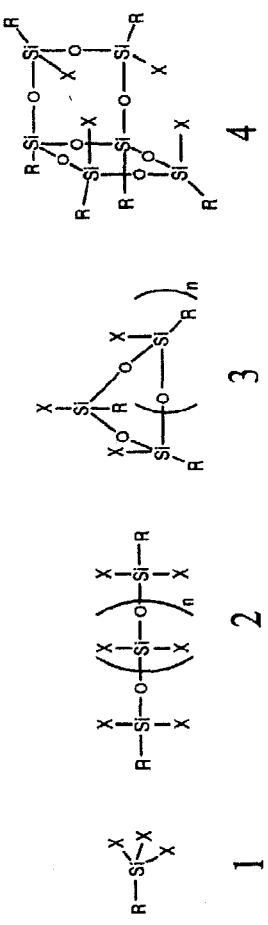
Fragment Examples: $RSiX_3(1), [(RXSiO_{0.5})n](2), [(RXSiO_{1.0})n](3), [(RSiO_{1.5})n(RXSiO_{1.0})m](4)$
FIG. 2/3

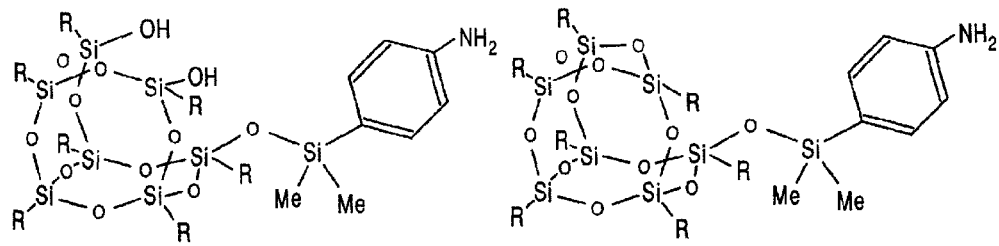
Mono-amines
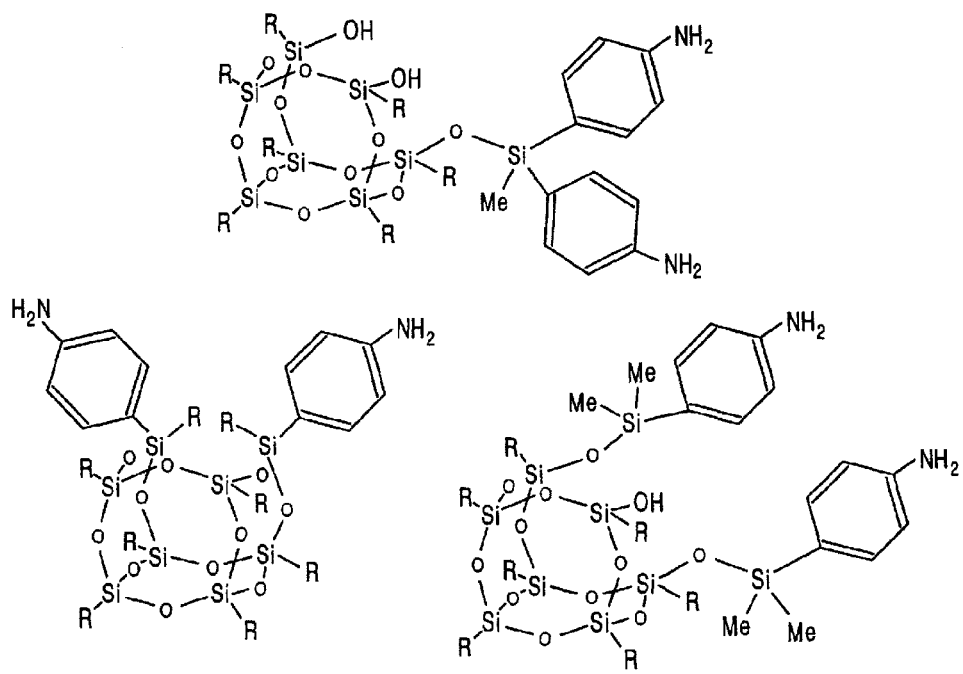
Di-amines
FIG. 4/1

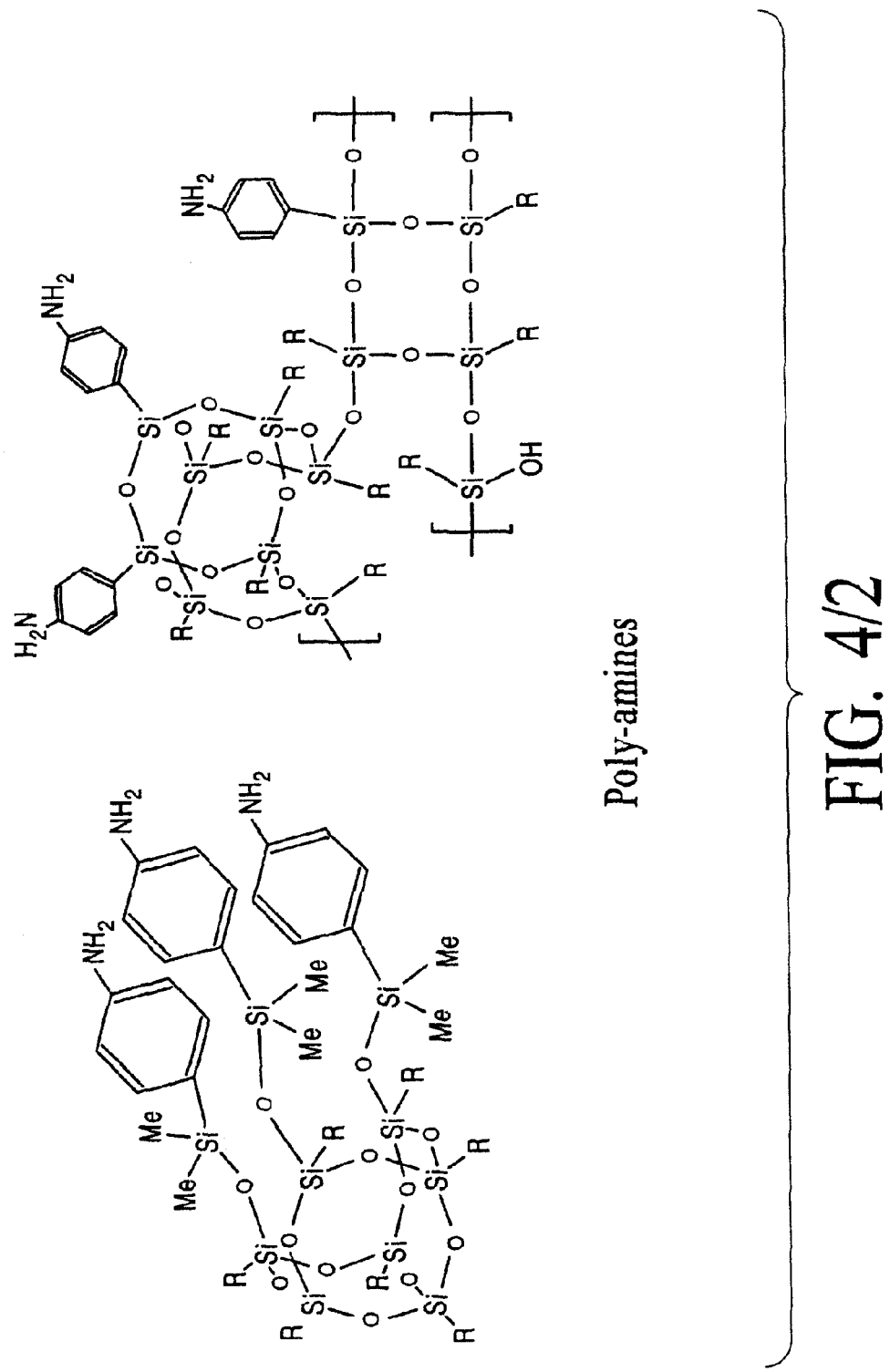
Poly-amines
FIG. 4/2

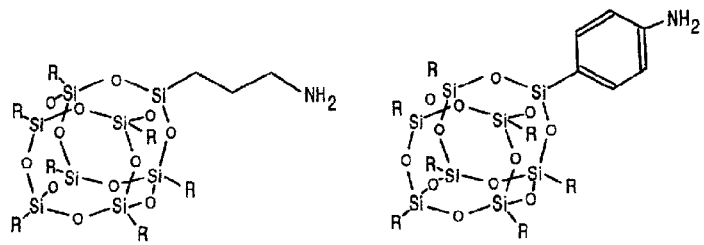
Mono-amines
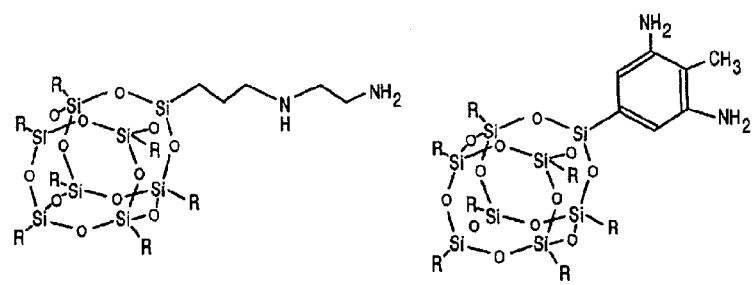
Di-amines
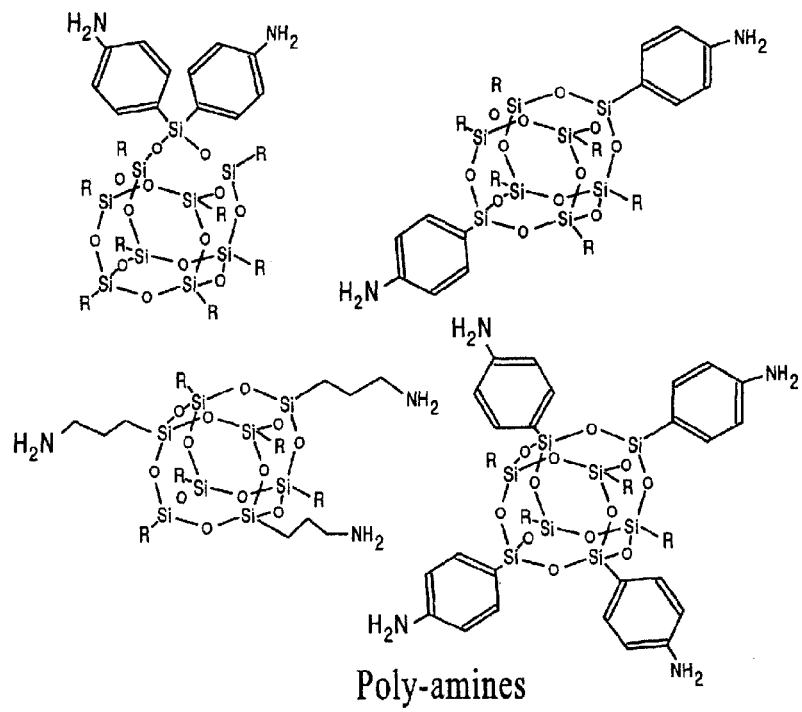
Poly-amines
FIG. 5

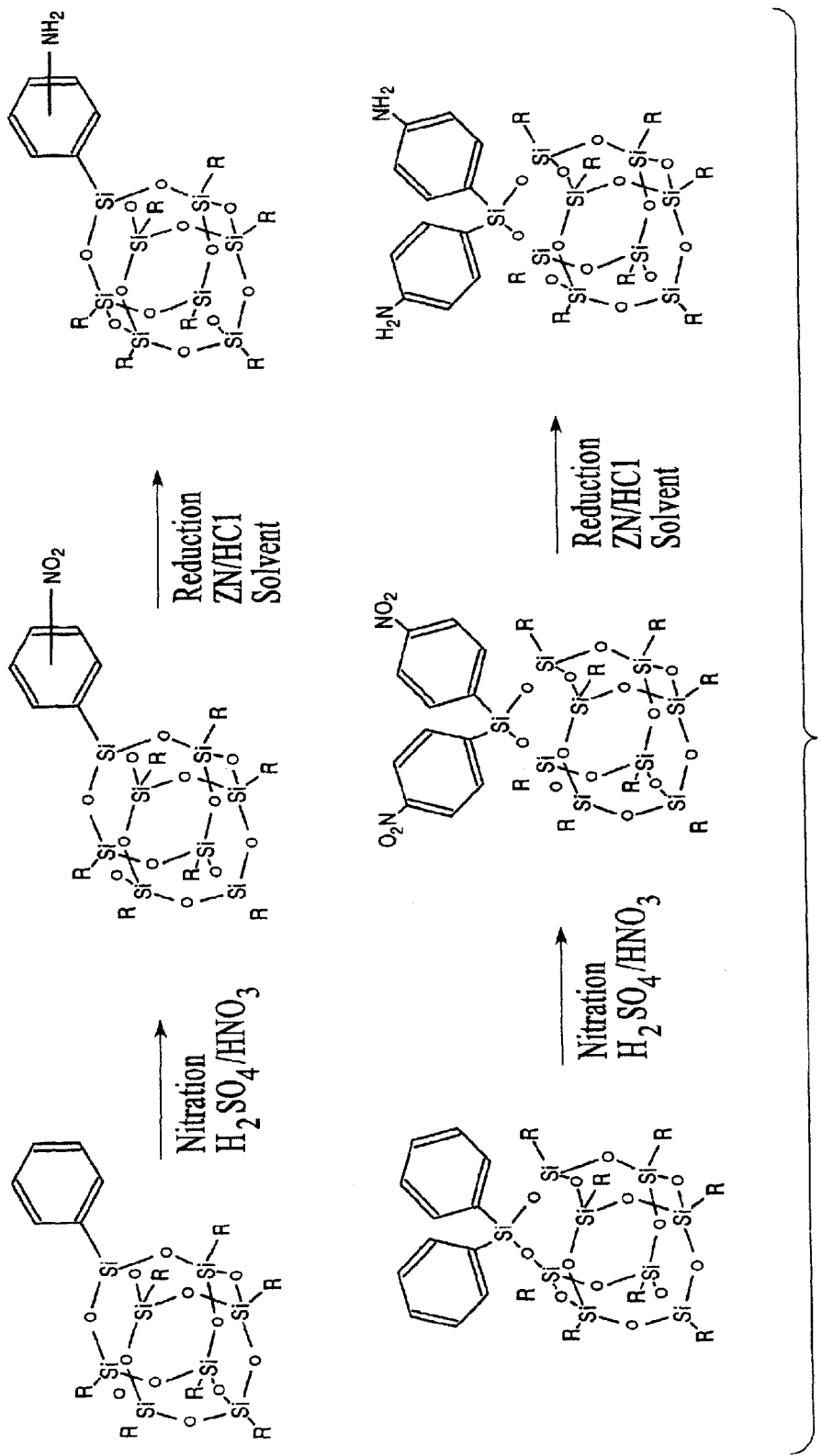
FIG. 6/1

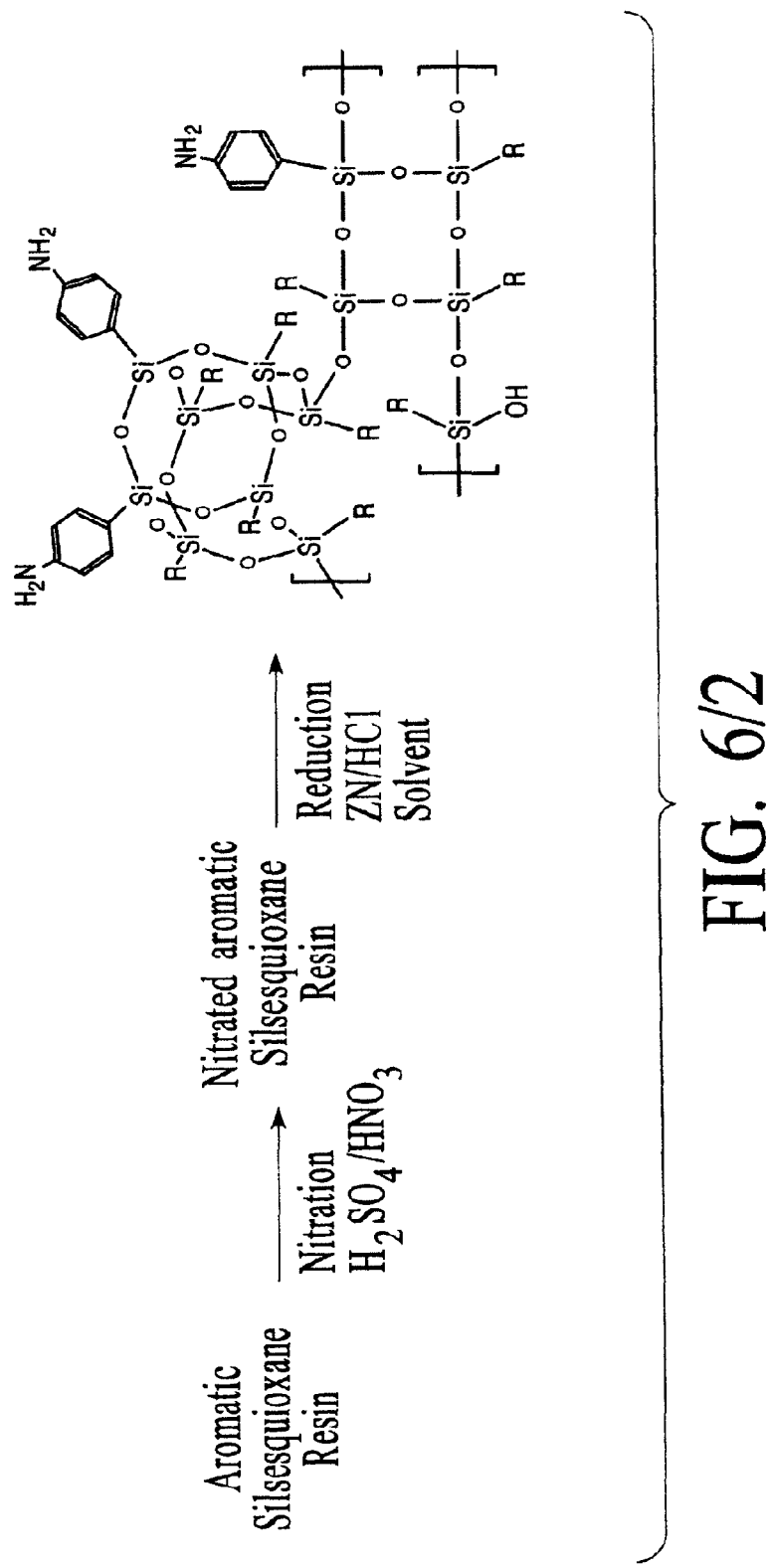
FIG. 6/2 ced Sep. 7, 2001. The

POLYHEDRAL OLIGOMERIC SILSESQUIOXANE POLYIMIDE COMPOSITES

The present application claims priority from provisional application serial No. 60/318,052 filed Sep. 7, 2001. The content of that application is hereby incorporated by reference.

BACKGROUND OF THE INVENTION

1. Field of the Invention

Performance additives in high performance polymers using polyhedral oligomeric silsesquioxanes (POSS) and polyhedral oligomeric silicates (POS) as nanoscopic reinforcements, porosity control agents, thermal and oxidative stability aids to improve the properties of the polymers.

2. Description of the Prior Art

There is a continuing need for polymeric materials that exhibit higher performance characteristics. In particular, many electronic and space vehicle component designs now demand materials with improved thermal and oxidative stability relative to that offered by the current level of imide, epoxy, and ester-based polymer resins. There exists a particular deficiency in the area of space resistant polymeric materials as there are no commercially available polyimides that are resistant to degradation by atomic oxygen. Prior art in this field describes attempts to improve survivability of imides to the space environment through the application of metals or metal-oxide coatings, which results in modest improvements but is not practical because of the additional processing steps and property mismatches (e.g. thermal expansion). Other approaches have involved the incorporation of fillers into polyimides through sol-gel methods or the blending of inorganic fillers. While conceptually simple the utility of this approach has also been limited. For example Yanno et al. have reported the use of complex processing steps (Hsiue, G -H, Chen, J -K., Liu, Y -L *J. Appl. Polym. Sci.*, 2000, 76, 1609–1618) and Gilman et al. have described the inherent incompatibility of such organofunctionalize fillers to uniformly disperse (Brown, J. M., Curliss, D., Vaia, R. A., *Chem. Mater.*, 2000, 12, 2279–3384) into the material at the molecular or nanoscopic level. Additional prior art has focused on the polymerization of silicones (Katz, U.S. Pat. No. 5,073,607) and phosphine oxides ((a) Smith, C. D., Grubbs, H., Webster, H. F. Gungor, A., Wightman, J. P., McGrath, J. E., 1991, *High Perform. Polym*, 3, 211. (b) Fewell, L. L., *J. Appl. Polym. Sci.*, 1990, 41, 391) into polyimides in attempts to ensure uniform dispersion of an oxide forming component that can serve to protect the polyimide through formation of a passivating layer. This approach has been successful in retarding the rate at which damage in polyimides occurs during atomic oxygen exposure but the method has proven of little utility in protecting from degradation by other types of radiation nor is the approach general enough to offer protection to other types of polymeric materials, such as epoxies, esters, elastomers and sealants, that are also desirable for use on space vehicles.

A related need for higher performance polymeric materials also exists in many electronic component designs. The requirements for improved thermal (in excess of 400° C.) and oxidative stability (to atomic oxygen, ozone, etc.) and reduced dielectric properties are similar to those needed for survivability in space environments. Prior art has been deficient in offering a generally applicable and easily implemented solution for upgrading the properties of imides, epoxy, ester and related polymeric materials desirable for use in the manufacture and packaging of electronic devices and systems. There exists a particular deficiency in the area of thermally stable, tough, and low dielectric constant (k<2.5) polymeric materials. Prior art in this field has involved the incorporation of fillers into polyimides through sol-gel methods or the blending of inorganic fillers. While conceptually simple the utility of this approach has also been limited due to inherent incompatibility, dispersion, and complex processing issues. Other approaches describe attempts to create desirable improvements in such polymers through the blending of amic-acid or imidized polymers with porogenic-type materials that introduce open-cell porosity upon their removal of the porgen by heating or extraction. (U.S. Pats. No. 6,204,202; 6,177,360; 6,107,357; 5,953,627). The effectiveness of this approach has been limited in that the introduction of open-cell porosity results in materials with poor ductility and durability whereas pores with a closed-cell structure would result in materials with more desirable properties.

All of the prior art pertaining to high performance polymeric materials fails to utilize nanoscopic entities as building blocks for the improvement of the characteristics of material and physical properties such as operational temperature range, durability, oxidative stability, flammability, and mechanical strength. Furthermore the prior art fails to recognize the important contribution that nanoscale reinforcements and varied nanoscopic topologies (shapes) can have on the physical properties.

Polyhedral oligomeric silsesquioxane (POSS) cage molecules, monomers, polymers, and resins as well as polyhedral oligomeric silicate (POS) (spherosilicate) cage molecules, monomers, polymers, and resins are increasingly being utilized as building blocks for the preparation of novel catalytic materials and as performance enhancement additives for commodity and engineering polymers. Their nanometer size and unique hybrid (inorganic-organic) chemical composition are responsible for the many desirable property enhancements that have been observed upon incorporation of POSS/POS reagents into polymer systems. Of special importance for high performance polymers is that the thermochemical properties of POSS molecules are very high (400–500° C.). (Mantz, R. A., Jones, P. F., Chaffee, K. P., Lichtenhan, J. D., Gilman, J. W., Ismail, I. M. K., Burmeister, M. J. *Chem. Mater.*, 1996, 8, 1250–1259) Additionally, POSS-siloxane copolymers have previously been shown to exhibit excellent resistance to oxidation by atomic oxygen. (Gilman, J. W., Schlitzer, D. S., Lichtenhan, J. D., *J. Applied Poly. Sci.* 1996, 60, 591–596). The ability of the nanoscopic POSS entity to be polymerized into all elastomers, thermoplastics, and thermoset polymers along with its inherent ability to absorb radiation and ability to form passivating silica layers upon oxidation renders it a general solution from which to develop the next generation of high performance resins for electronic and space system applications. The resulting silica layer and POSS nanoreinforcement also serve to protect the virgin material from damage by ultraviolet radiation as they both absorb UV of 256 nm and higher (FIG. 1).

SUMMARY OF THE INVENTION

This invention teaches the use of nanoscale POSS and POS chemicals as performance additives that can be polymerized or noncovalently blended into high performance polymers (imides, epoxies, ester) for the introduction of nanoscopic reinforcements, porosity control agents, thermal and oxidative stability aids that improve the interfacial, surface, physical and mechanical properties of high performance polymeric resin systems. The precisely defined nanoscopic features provided by the POSS/POS agents provide multi-length scale levels of reinforcement in such polymers and hence can be used synergistically with conventional fillers and fiberous reinforcements and fillers. POSS/POS can be incorporated into high performance polymers using nonreactive compounding or blending, reactive processing and reactive grafting, or through copolymerization.

BRIEF DESCRIPTION OF THE DRAWINGS

FIG. 2 shows examples of common silsequioxane, silicate, POSS nanostructures and fragments;

FIG. 4 shows open-cage mono, di, and poly functional amines;

FIG. 5 shows closed-cage mono, di, and poly functional amines;

FIG. 6 shows a route for efficient synthesis of POSS-analines;

Definition of Formula Representations for Nanostructures

Nanoscale chemicals are defined by the following features. They are single molecules and not compositionally fluxional assemblies of molecules. They possess polyhedral geometries with well-defined three-dimensional shapes. Clusters are good examples whereas planar hydrocarbons, dendrimers and particulates are not. They have a nanoscopic size that ranges from approximately 0.7nm to 5.0 nm. Hence, they are larger than small molecules but smaller than macromolecules. They have systematic chemistries that enable control over stereochemistry, reactivity and their physical properties.

For the purposes of understanding this invention's nanoscale chemical compositions, the following definition for formula representations of Polyhedral Oligomeric Silsesquioxane (POSS) and Polyhedral Oligomeric Silicate (POS) nanostructures is made.

$[(RSiO_{1.5})_n(R'SiO_{1.5})_m]_{\Sigma\#}$ for heteroleptic compositions (where $R \neq R'$)

$[(RSiO_{1.5})_n(RXSiO_{1.0})_m]_{\Sigma\#}$ for functionalized heteroleptic compositions (where R groups can be equivalent or inequivalent)

$[(RSiO_{1.5})]_\infty$ for polymeric compositions $[(XSiO_{1.5})]_{\Sigma\#}$ for homoleptic silicate compositions In all of the above R=organic substituent (H, siloxy, cyclic or linear aliphatic or aromatic groups that may additionally contain reactive functionalities such as alcohols, esters, amines, ketones, olefins, ethers or halides). X includes but is not limited to OH, Cl, Br, I, alkoxide (OR), acetate (OOCR), peroxide (OOR), amine ($NR_2$) isocyanate (NCO), and R. The symbols m and n refer to the stoichiometry of the composition. The symbol $\Sigma$ indicates that the composition forms a nanostructure and the symbol # refers to the number of silicon atoms contained within the nanostructure. The value for # is usually the sum of m+n. It should be noted that $\Sigma\#$ is not to be confused as a multiplier for determining stoichiometry, as it merely describes the overall nanostructural characteristics of the system (aka cage size).

POSS Fragments are defined as structural subcomponents that can be assembled into POSS nanostructures and are represented by formula $[(RSiO_{1.5})_n(RXSiO_{1.0})_m]$. Note the symbols $\Sigma\#$ are absent as these fragments are not polyhedral nanostructures.

Examples of common silsesquioxane, silicate, POSS nanostructures and fragments are shown in FIG 2.

DETAILED DESCRIPTION OF THE INVENTION

Figure 1:
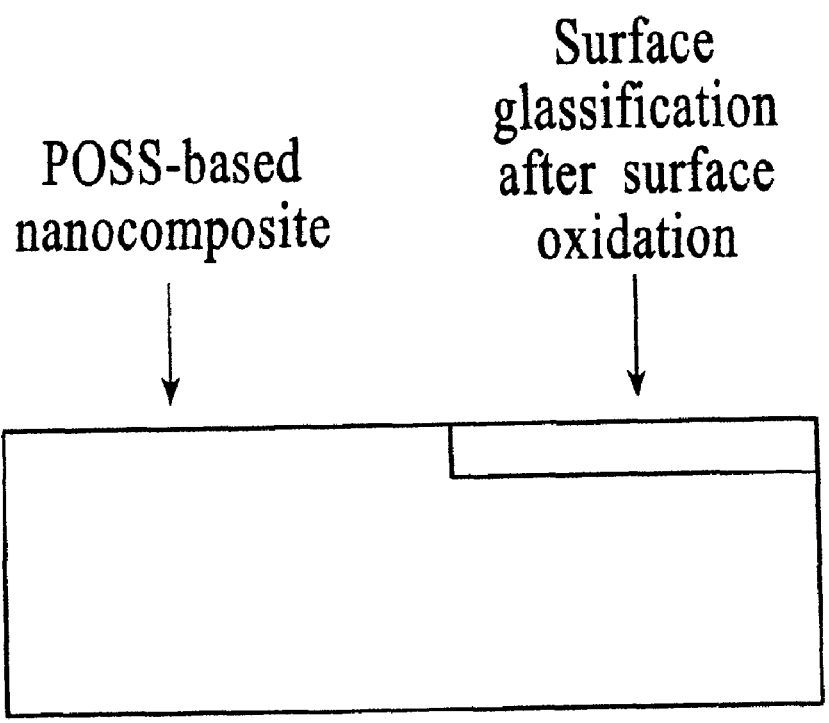
FIG. 1 illustrates formation of a passivating surface layer upon oxidation of a POSS-resin.
Figure 3:
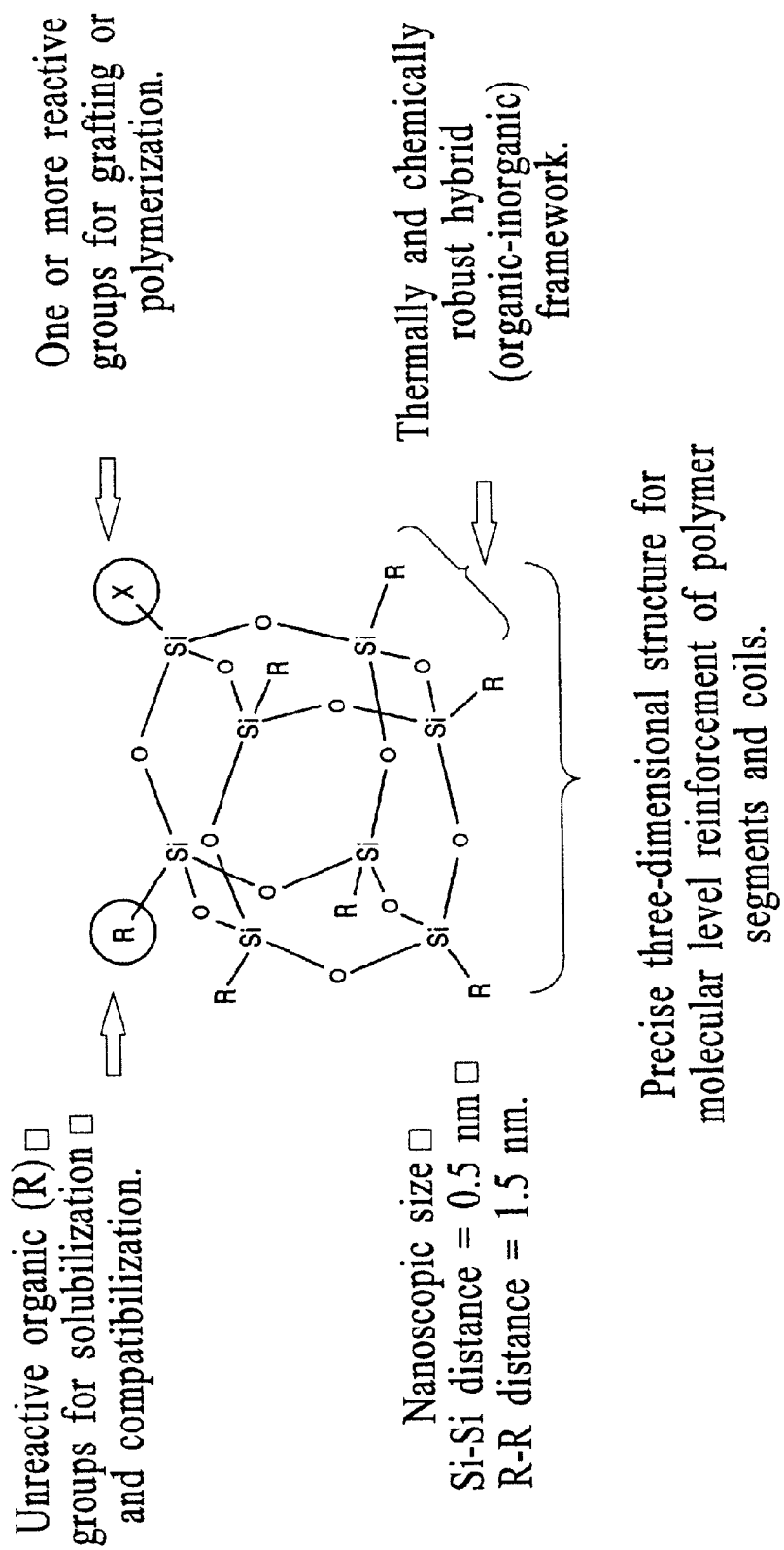
FIG. 3 shows the anatomy of a POSS nanoscale chemical.

A structural representation for nanoscale chemicals based on the class of chemicals known as polyhedral oligomeric silsesquioxanes (POSS) is shown in FIG. 3.

Their features include a unique hybrid (organic-inorganic) composition that possesses many of the desirable physical characteristics of both ceramics (thermal and oxidative stability) and polymers (processibility and toughness). In addition they possess an inorganic skeleton which is externally covered by compatiblizing organic groups R and reactive groups X where R=organic substituent (H, siloxy, cyclic or linear aliphatic or aromatic groups that may additionally contain reactive functionalities such as alcohols, esters, amines, ketones, olefins, ethers or halides). X includes but is not limited to OH, Cl, Br, I, alkoxide (OR), acetate (OOCR), peroxide (OOR), amine ($NR_2$) isocyanate (NCO), olefin, and R.

Methods describing the systematic variation of cage size and distribution (U.S. patent application Ser. No. 09/631,892) (the disclosure of which is hereby incorporated by reference), along with the systematic variation of R and R—Y groups on the POSS/POS systems have been accomplished using the following methods: silation, U.S. Pat. No. 5,484,867; hydrosilation, U.S. Pat. No. 5,939,576; metathesis, U.S. Pat. No. 5,942,638, group substitution, U.S. Pat. No. 6,100,417; and through direct synthesis (U.S. Pat. No. 5,047,492 and U.S. patent application Ser. No. 10/186,318 (the disclosure of which is hereby incorporated by reference)). The design and synthesis of POSS/POS compounds with cage sizes and shapes along with R and RY groups desirable for all conceivable has been accomplished using the above mentioned methods.

The unique hybrid (organic-inorganic) composition possesses many of the desirable physical characteristics of ceramics (thermal and oxidative stability) and polymers (processibility and toughness). In addition, the inorganic skeleton, comprised of silicon-oxygen bonds, is externally covered by compatiblizing organic groups R and reactive groups Y where R=organic substituent (H, siloxy, cyclic or linear aliphatic or aromatic groups that may additionally contain reactive functionalities such as alcohols, esters, amines, ketones, olefins, ethers or halides). Y includes but is not limited to OH, Cl, Br, I, alkoxide (OR), acetate (OOCR), peroxide (OOR), amine ($NR_2$) isocyanate (NCO), olefin, and R. The inorganic skeleton coupled with the peripheral groups combine to form chemically precise cage-like low density nanoscopic materials that improve the physical properties of a wide range of materials.

The size of POSS is roughly equivalent to that of most polymer dimensions, thus at a molecular level POSS can effectively introduce porosity into existing polymer morphologies (see Table 1).

TABLE 1

Relative sizes of POSS, polymer dimensions, and fillers.

| Particle Type | Particle Diameter |
|---|---|
| Amorphous Polymer Segments | 0.5 nm to 5 nm |
| Octacyclohexyl POSS | 1.5 nm |
| Random Polymer Coils | 5 nm to 10 nm |
| Colloidal Silica | 9 nm to 80 nm |
| Crystalline Lamellae | 1.0 nm to 9,000 nm |
| Fillers/Organoclays | 2 nm to 100,000 nm |

Representative formula for nanoscale POSS/POS chemicals that are desirable for incorporation into high performance polymers via nonreactive blending are the closed-cage homoleptic systems corresponding to the formula $[(RSiO_{1.5})]_{\Sigma\#}$ and $[(XSiO_{1.5})_n]_{\Sigma\#}$ and the open-cage formula corresponding to functionalized homoleptic POSS $[(RSiO_{1.5})_n(RXSiO_{1.0})_m]_{\Sigma\#}$ and functionalized heteroleptic POSS $[(RSiO_{1.5})_n(R'SiO_{1.5})_m(RXSiO_{1.0})_p]_{\Sigma\#}$ and POSS resins $[RSiO_{1.5}]\infty$.

These systems can be incorporated into high performance polymers through mixing with monomer or at the prepolymerization stages. The methods of incorporation involve high shear mixing, solvent mixing, milling and blending with high shear mixing being preferred. The level of property enhancement is dependent upon loading level, the size/shape and distribution of the POSS nanostructures and upon processing conditions. The loading levels range from 0.1% to 99% with levels of 10–30% being preferred.

Representative open-cage formula for nanoscale POSS/POS chemicals that are desirable for incorporation into high performance polymers via reactive blending and reactive grafting include monofunctional systems, difunctional systems and polyfunctional formulations (FIG. 4).

Representative formula for nanoscale POSS/POS chemicals that are desirable for incorporation into high performance polymers via copolymerization include both closed-cage and open-cage formulations and are shown in FIG. 5.

While both open-cage and closed-cage nanostructures can be incorporated into identical formulations the open-cage nanostructures are desirable for formulations that required additional ductility. While the closed-cages are more rigid, they also provide formulations with enhanced modulus relative to open-cage nanostructures. Open-cage formulations containing residual silanol groups also show enhanced adhesion.

Monofunctional POSS-monomers are suitable for grafting onto high performance polymers as pendant side-chain groups and as chain terminators in the same manner as a traditional monoamine or monanhydride. Monofunctional POSS-monomers are particularly useful for reinforcing thermoplastics resins and for providing additional reinforcement to themoset systems. (Lee, A., Lichtenhan, J. D., *Macromolecules* 1998, 31, 4970–4974). Difunctional POSS-monomers are designed for direct copolymerization into the backbone of polymers in the same manner as a traditional diamine or dianhydride. Difunctional POSS-monomers are particularly useful for incorporation into thermoplastics systems yet can also be used as crosslinkers. Polyfunctional amines are ideally suited as crosslinkers, and adhesion promoters for thermoset systems.

The amine-functionalized POSS systems shown in FIGS. 4 and 5 have direct utility in imides, epoxies, urethanes, urea, novolac, and amide polymer systems. These same structural formula can also be modified with anhydride, epoxy, maleimide, oxazoline, cyanate esters, ester, acid, and alcohol functionalities that would render them desirable for incorporation into other high performance polymers such as nylons, polyurethanes, epoxides, cyanate esters, bismaleimides, polybenzoxizoles, polybenzimidizoles, polybenzthiozoles, polyesters, and phenolics.

Methods of Monomer and Polymer Synthesis

In order to prepare POSS-monomers and POSS-polymers economically and on a commercial scale, improved synthetic routes to several key materials have been developed. One of these processes involves the nitration and amination of aromatic POSS-systems to yield mono, bis or polyfunctional POSS-amines (FIG. 6).

Note this process is general and can be conducted on all types of POSS cages and resins. It is advantageous over existing methods because the reduction step is accomplished in one step at room temperature using inexpensive zinc metal and muratic acid both of which are commodity chemicals. Prior reductive methods have required the use of either expensive rare metals (e.g. Rh) or have required high temperatures and pressures.

Alternate methods of POSS-analine monomer synthesis include metal catalyzed coupling reactions by well known processes such as the Heck reaction, the Suzuki reaction, the Stille reaction and the Sona Gashira reaction. For example, the preparation of POSS-analine using the Heck route is most desirably accomplished through the reaction of a vinyl-functionalized POSS cage with an amine functionalized aromatic halide (or visa versa) in the presence of a palladium or nickel catalyst. The Suziki route yields POSS-analines by reacting an aromatic halide functionalized POSS with an amine functionalized aromatic halide in the presence of boronic acid and a palladium or nickel catalyst. The Stille method produces POSS-analines through the reaction of an aromatic halide functionalized POSS with a tin or silicon functionalized aromatic amine (or visa versa) in the presence of a palladium or nickel catalyst. The Sona Gashira method produces POSS-analines through the reaction of an acetylene functionalized POSS with an amine functionalized aromatic halide (or visa versa) in the presence of a palladium or nickel catalyst.

Figure 7:
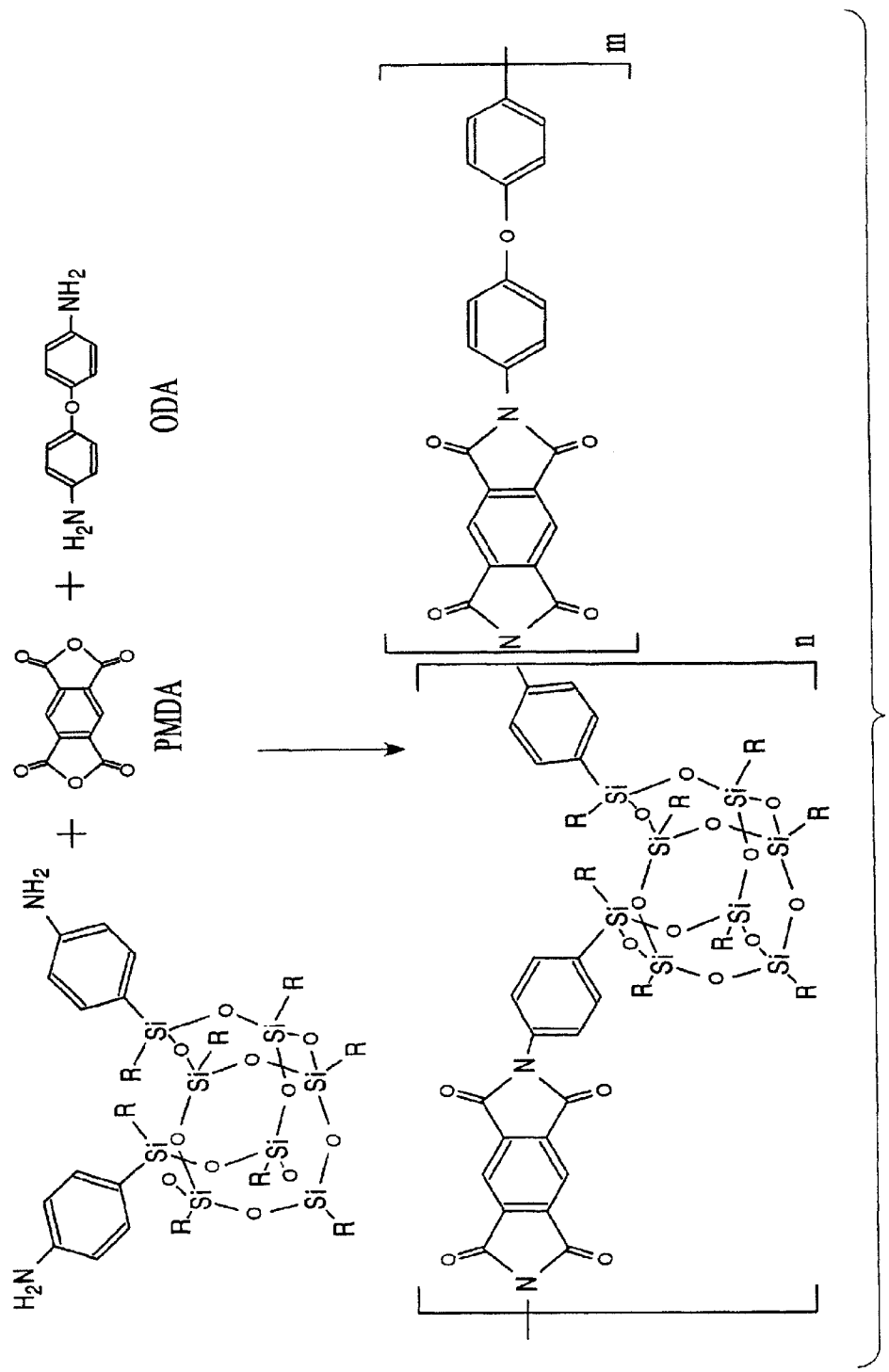
FIG. 7 shows a synthetic route yielding a POSS-polyimide polymer.

The incorporation of the various POSS-analine monomers into various types of polymers is straightforward. An advantage of the POSS-monomer technology over other related nano and filler technologies is that is designed to be used in turnkey fashion and does not require alteration of existing manufacturing protocols. Furthermore, it results in entirely new compositions of matter that utilize nanoscopic reinforcements directly polymerized into the polymer back bone. For example difunctional POSS amines are readily reacted with pyromellitic dianhydride (PMDA) and oxydianiline (ODA) to yield Kapton®-type polymers (FIG. 7).

Figure 8:
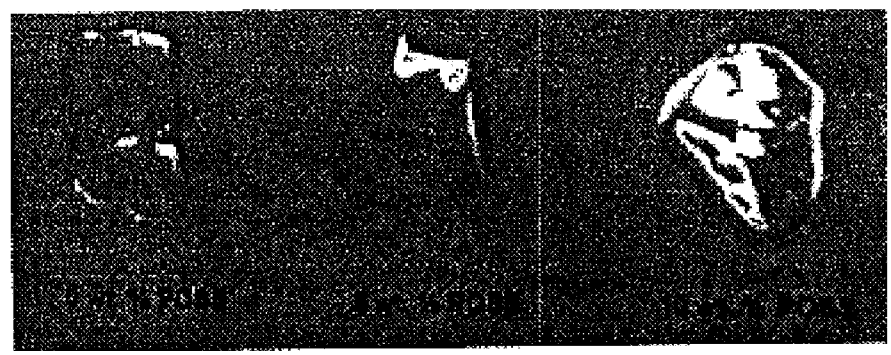
FIGS. 8 and 9 show cast films and thermal mechanical properties for a POSS-polyimide polymer.
Figure 9:
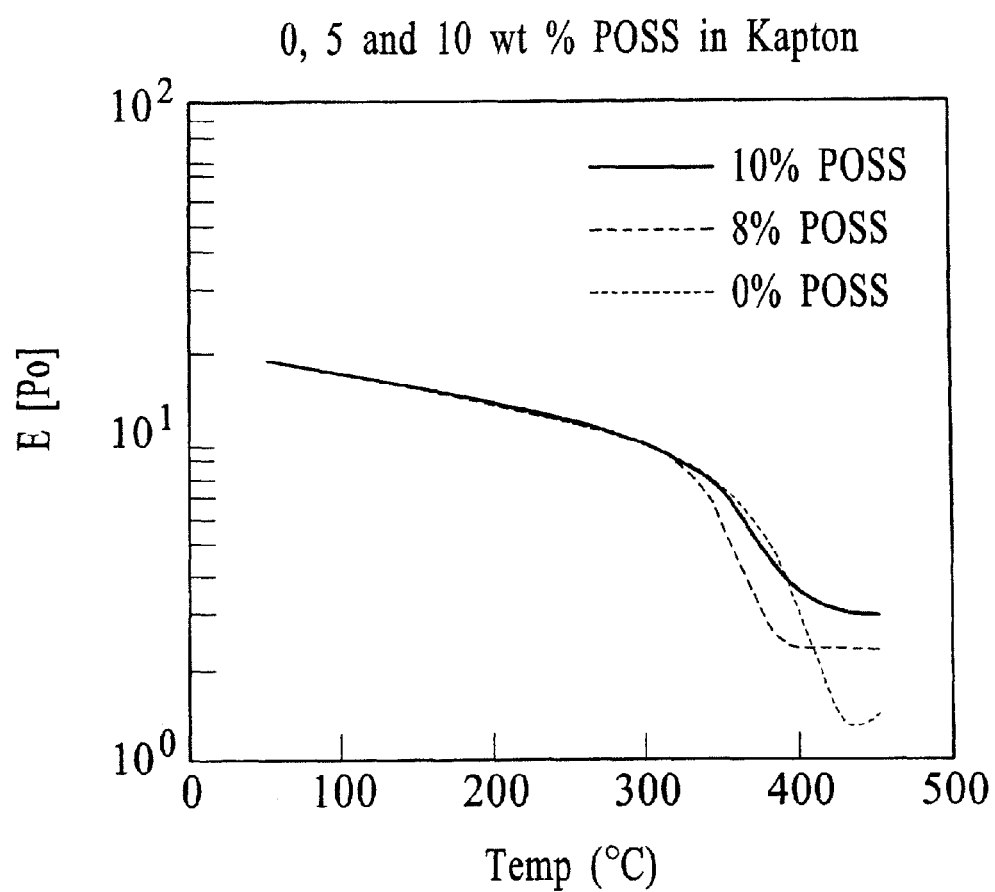

The resulting POSS-polyimide copolymer is a tough yellowish resin with excellent thermal, mechanical properties as well as oxidative stabilities (FIGS. 8, 9, and Table 2).

TABLE 2

Selected erosion and mechanical data for Kapton ™ and the POSS polyimide equivalent.

| Material | AO Erosion Rate (cm³/atom) | Youngs Modulus (Ksi) | Tensile (Ksi) | Strain (%) | *Tg (° C.) air | *Tg (° C.) N₂ |
|---|---|---|---|---|---|---|
| Kapton ® | 1 | 348 | 9.0 | 4.86 | 386 | 389 |
| 10% POSS-Kapton ® | 0.1 | 370 | 10.8 | 6.59 | 380 | 381 |
| 20% POSS-Kapton ® 90% Ultem ™ | 0.01 | 321 | 7.5 | 3.89 | 370 | 373 |

*Glass transition was measured via DMA. The Tg of Dupont's Kapton H is reported to range from 360–410° C. depending upon the method of measurement.

In comparison it was observed that POSS incorporation into polyimides results in an order of magnitude reduction of the erosion rate caused by exposure to atomic oxygen. These findings are consistent with the findings of Gilman et al. for POSS-siloxane copolymers. Additionally beneficial are the increases in modulus tensile and strain properties which indicate that POSS incorporation also improves toughness of these high performance materials. Analysis of these same materials through dynamical mechanical testing indicates the presence of a rubber plateau at 400° C. This rubbery region indicates that the POSS-reinforced systems are amenable to approximately a 50° C.–100° C. higher usage temperature relative to the non-nanoreinforced system. The increased usage temperature directly results from the POSS-entities controlling the motion of the polymer chains at elevated temperatures and thereby retaining mechanical integrity throughout a broader temperature range (despite the similarity in glass transition (Tg)).

Figure 10:
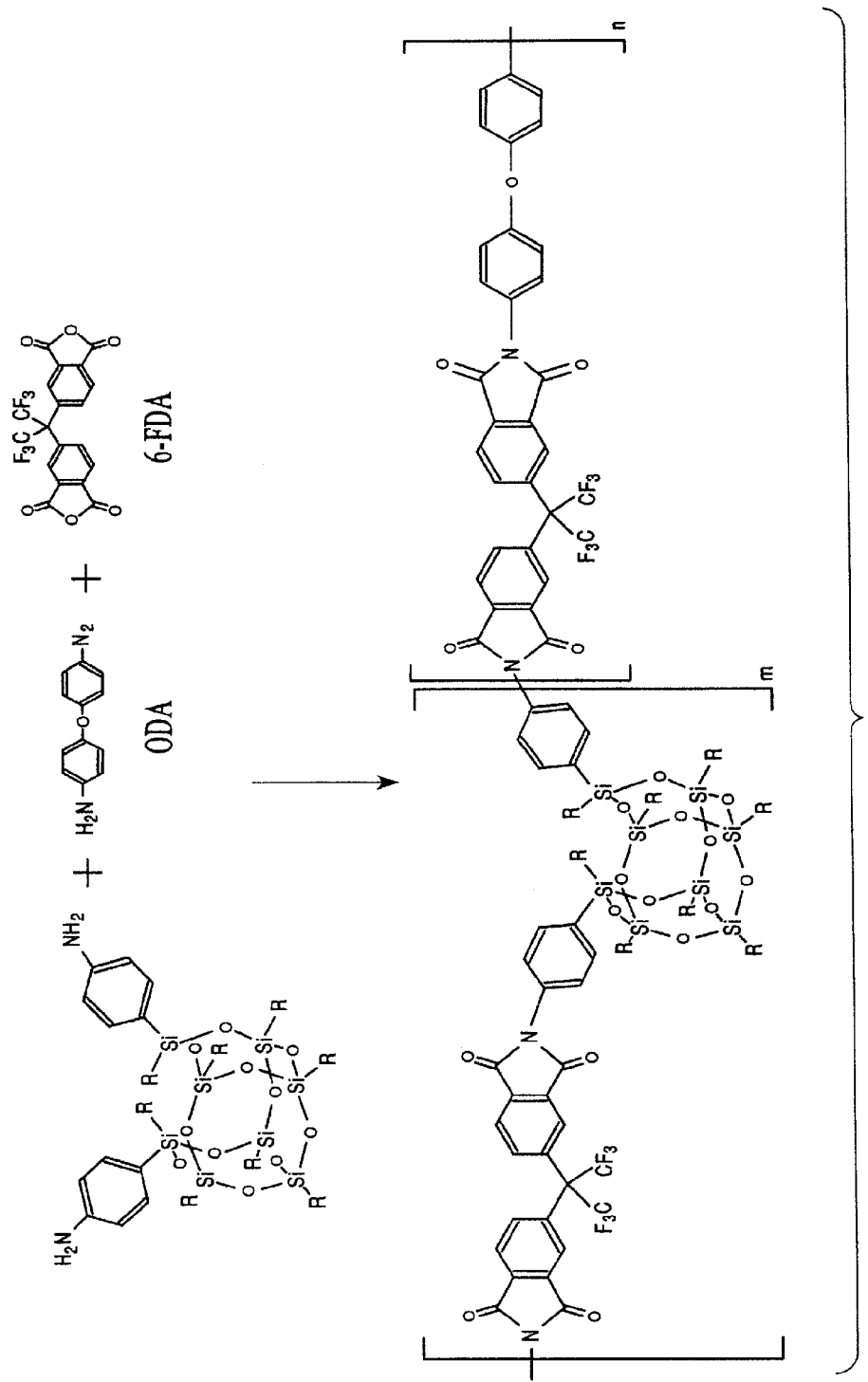
FIG. 10 shows the formula and structure for a fluorinate POSS-polyimide.

In a likewise manner, POSS-amines can be reacted with fluorinated anhydrides such as 4,4' (hexafluoroisopropylidene)dipthalic anhydride (6-FDA) along with ODA to form colorless POSS-polyimides (FIG. 10).

Figure 11:
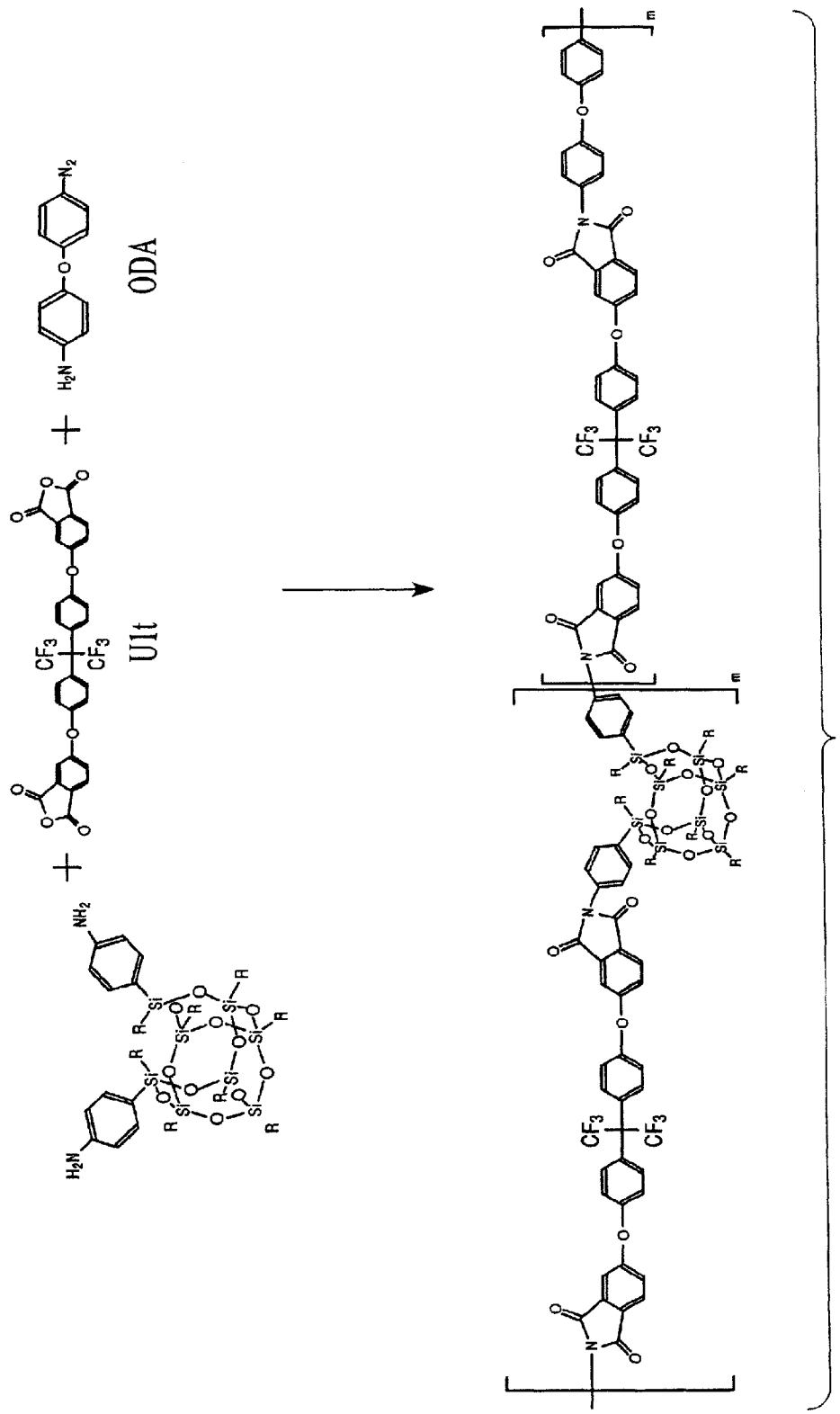
FIGS. 11 and 12 shows the formula and structure for POSS-polyetherimides.

In a likewise manner POSS-amines can be reacted with 4,4'-(4,4'-Isopropylidenediphenoxy)-bis(pthalic anhydride) (Ult) and ODA to form the nanoreinforced version of Ultem® (FIG. 11).

Figure 12:
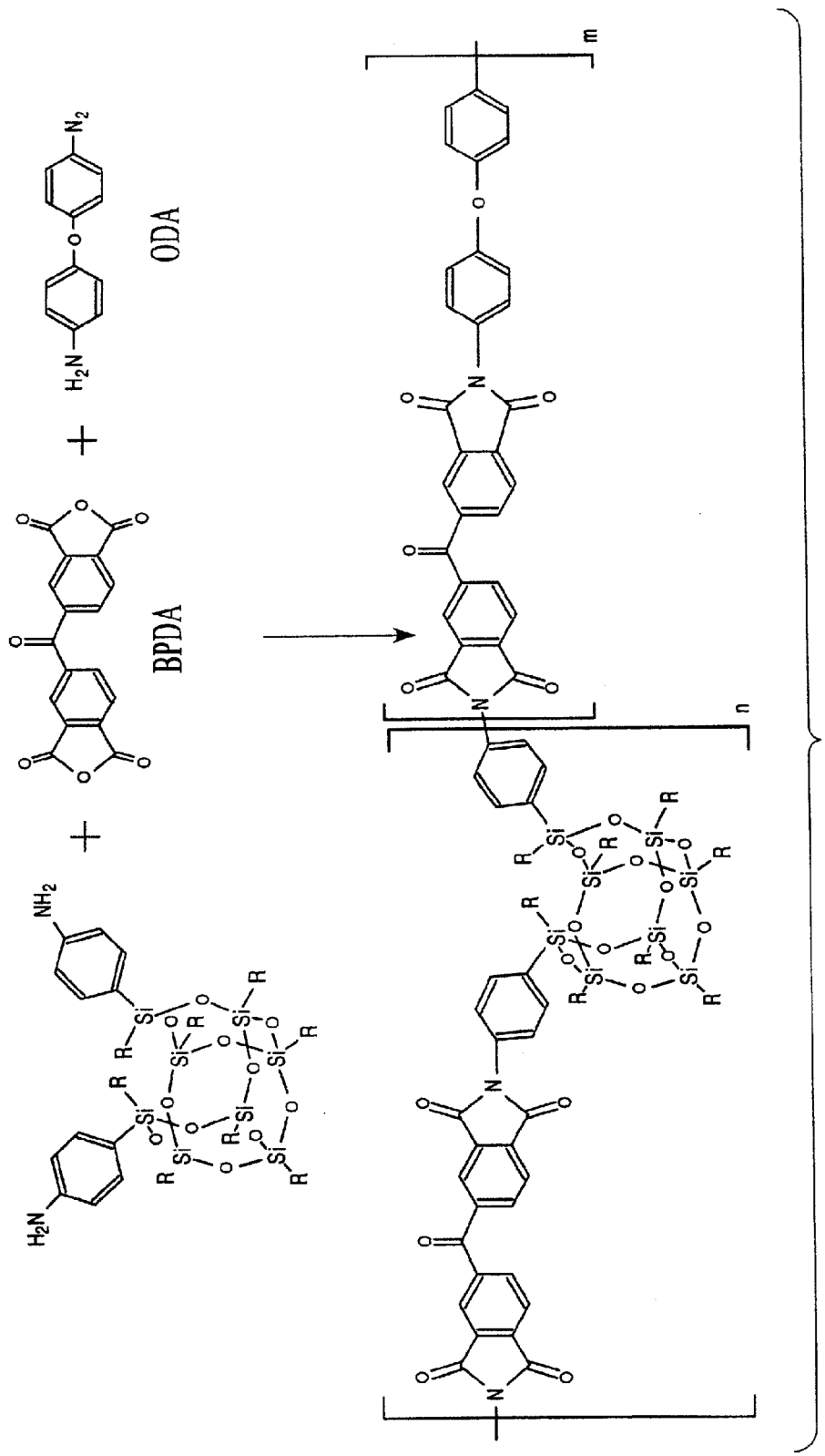

POSS-amines can be reacted with a wide range of other anhydrides such as 3,3',4,4'-Benzophenonetetracarboxylic dianhydride (BPDA) along with ODA to form a wide range of nanoreinforced POSS-Imide copolymer. Combination of amine and anhydride ratios offers a tremendous ability to tailor mechanical and physical properties. (FIG. 12).

The incorporation of POSS/POS in to polyimide and related high performance polymer formulations can be accomplished through conventional blending and mixing techniques including both high and low shear mixing, milling, solvent and supercritical fluid assisted blending as well as through conventional polymerization techniques.

The degree of enhancement of physical properties is dependant upon the loading level of the POSS/POS component incorporated, the size of the silicon-oxygen cage, the size of the nanostructure (R-group effects), the nature of incorporation, and the interfacial compatibility between the nanoreinforcement and the polymer.

POSS/POS can be used both as a stand alone replacement or as an additive to existing high performance polymer formulations. POSS incorporation as an additive into existing polymer systems has been shown to effect significant improvements in mechanical and physical properties.

EXAMPLES

Alloying performance polymers with POSS/POS. Prior to mixing, all POSS/POS and polymers should be predried at 60° C. to 100° C. under vacuum for three hours or via a similarly effective procedure to ensure removal of traces of water or other volatiles. POSS/POS is introduced using a weight loss feeder at the desired wt % into the mixing vessel of a shear mixer containing the desired formulation components. The mixing residence time can be varied from 1 min to 60 min prior use of the formulation. Twin screw compounding is the preferred method of incorporation.

Solvent Assisted Application Method for Formulation. POSS/POS is added to a vessel containing the desired polymer, prepolymer or monomers and dissolved in a sufficient amount of an organic solvent (e.g. hexane, toluene, dichlormethane etc.) to effect the formation of one homogeneous phase. The mixture is then stirred under high shear at room temperature for 30 minutes and the volatile solvent is then removed and recovered under vacuum or using a similar type of process including distillation. Note that supercritical fluids such as $CO_2$ can also be utilized as a replacement for the flammable hydrocarbon solvents. The resulting formulation may then be used directly or stage-reacted for subsequent processing.

General Polymerization Method for POSS-polyimides. All monomers used are purified using standard recrystallization techniques. Using oven-dried glassware, and dry solvents, conduct the reaction under nitrogen. The corresponding anilines are added in 25 mL round bottom flask, in a nitrogen glove box and the anhydride is added to another 25 mL round bottom flask. 3 mL of purified N,N-dimethylacetamide (DMAc) is added to each flask. The anilines will dissolve, however the anhydride will form a slurry. The aniline solution is then transferred via syringe to a 250 mL 3-neck reactor flask equipped with a mechanical stirrer. The aniline flask is then wash twice with 1 mL of DMAc and the washes are added to the reactor. 5 mL of DMAc is added to the reactor. The anhydride slurry is then added to the reactor via syringe and the flask is also washed twice with 1 mL of DMAc. Upon addition of the anhydride to the reactor, the solution will turn yellow and homogenous almost immediately. The reaction is let run for 4 hours. A film is then cast from the resulting polyamic acid on a glass plate and placed in a clean oven with flowing nitrogen at 80 degrees Celsius for 4 hours. The temperature of the oven is then slowly raised to 300 degrees Celsius at which point the film is let cure for approximately 1 hour.

Nitration: Preparation of $[(c\text{-}C_5H_9)SiO_{1.5}]_7(O_2NC_6H_5SiO_{1.5})_1]_{\Sigma 8}$. A 10 gram sample of $[(c\text{-}C_5H_9)SiO_{1.5})_7(C_6H_5SiO_{1.5})_1]_{\Sigma 8}$ was dissolved in approximately 150 of carbon tetrachloride. In a 500ml flask 50 mL of $H_2SO_4$ followed by 50 mL of $HNO_3$ were added slowly while stirring. The mixture is then slowly transferred to a muratic acid solution and allowed to stir for 1 hr. The acid/POSS/$CCl_4$ solution is then slowly added to a 500 ml of chilled deionized water. The mixture is then transferred to a separatory funnel and extracted using three 25 mL extractions of $CCl_4$. The bottom $CCl_4$ organic layer is then extracted with brine and neutralized with sodium bicarbonate. The volatiles are the removed under vacuum. The product may be further purified by dissolving in 75 mls of THF and precipitating into 300 mls of MeOH and dried to produce $[(c\text{-}C_5H_9)SiO_{1.5})_7(O_2NC_6H_5SiO_{1.5})_1]_{\Sigma 8}$ as a fine white powder (90% yield).

Reduction: Preparation of $[(c\text{-}C_5H_9)SiO_{1.5}]_7$ $(H_2NC_6H_5SiO_{1.5})_1]_{\Sigma 8}$. A 5 gr sample of $[(c\text{-}C_5H_9)SiO_{1.5})_7$ $(O_2NC_6H_5SiO_{1.5})_1]_{\Sigma 8}$ and 6 equivalents dissolved in THF in a 500 mL round bottom flask while stirring. To the resulting dark gray slurry, is added approximately 7 equivalents of concentrated (12M) HCl. As the reaction proceeds, the soln will become clear and any excess zinc will agglomerate and sink to the bottom of the stirring flask. The resulting $ZnCl_2$ that is formed is soluble in THF. The reaction is stirred for 1 hr, then filtered and taken to dryness. The resulting solid is then redissolved in a minimum of diethylether and precipitated into excess methanol, filtered and dried. The resulting $[(c\text{-}C_5H_9)SiO_{1.5})_7(H_2NC_6H_5SiO_{1.5})_1]_{\Sigma 8}$ is obtained in quantitative yield as an off-white fine powder.

Although the present invention has been described above, it will be appreciated that certain alterations or modifications thereon will be apparent to those skilled in the art. It is therefore that the appended claims be interpreted as covering all such alterations and modifications that fall within the true spirit and scope of the invention.

What is claimed is:

1. A composite material having open-cell or closed-cell nanostructures yielding improved physical properties, wherein the composite material comprises:
   (a) a polyimide; and
   (b) a POSS or POS nanostructure material reactively polymerized with the polyimide.

2. The composite material of claim 1, wherein the composite material protects against space-related oxidation and debris through formation of a protective oxide layer.

3. The composite material of claim 1, wherein the composite material protects against oxidation during electronic component manufacture through formation of a protective oxide layer.

4. The composite material of claim 1, wherein the composite material includes a protective oxide layer that enhances surface adhesion.

5. A composite material having open-cell or closed-cell nanostructures yielding improved physical properties, wherein the composite material comprises:
   (a) a polyimide; and
   (b) a POSS or POS nanostructure material nonreactively blended with the polyimide.

6. The composite material of claim 5, wherein the composite material protects against space-related oxidation and debris through formation of a protective oxide layer.

7. The composite material of claim 5, wherein the composite material protects against oxidation during electronic component manufacture through formation of a protective oxide layer.

8. The composite material of claim 5, wherein the composite material includes a protective oxide layer that enhances surface adhesion.

* * * * *